No. 876,565. PATENTED JAN. 14, 1908.
K. LANDAN.
GATE.
APPLICATION FILED FEB. 18, 1907.
2 SHEETS—SHEET 2.
Fig. 3.
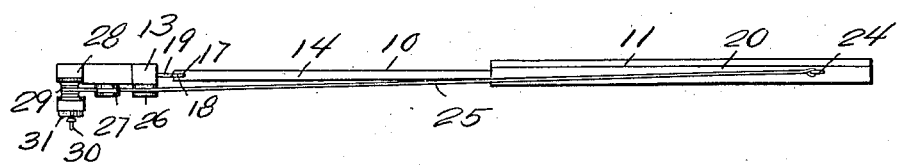
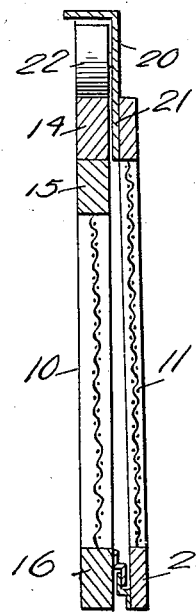
Fig. 4.
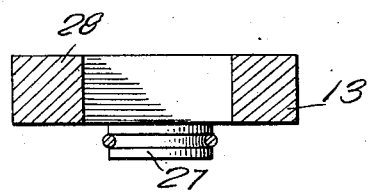
Fig. 5.
Inventor
Katharina Landan
Witnesses
G. R. Thomas
M. J. Miller
By 
Attorneys

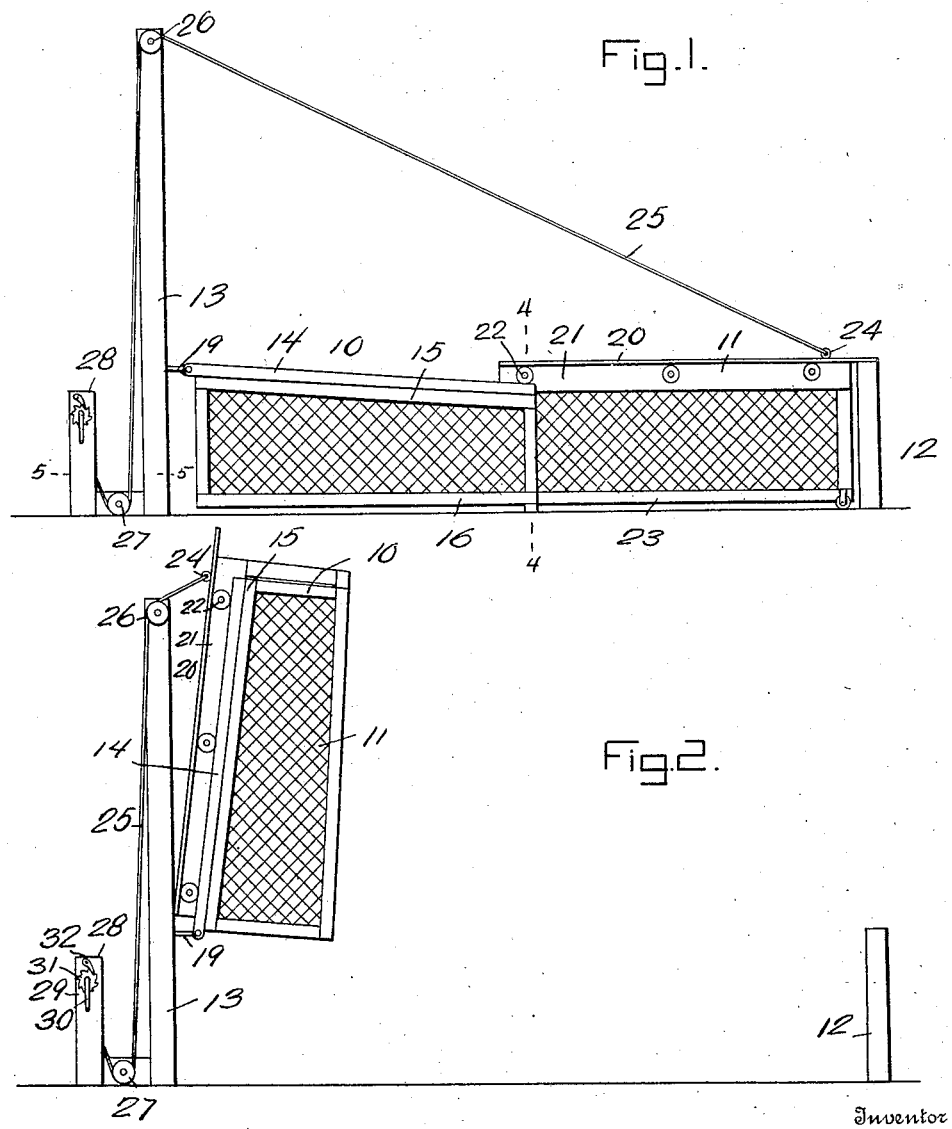

UNITED STATES PATENT OFFICE.

KATHARINA LANDAN, OF WATERLOO, IOWA.

GATE.

No. 876,565.  Specification of Letters Patent.  Patented Jan. 14, 1908.

Application filed February 18, 1907. Serial No. 357,899.

To all whom it may concern:

Be it known that I, KATHARINA LANDAN, a citizen of the United States, residing at Waterloo, in the county of Blackhawk, State of Iowa, have invented certain new and useful Improvements in Gates; and I do hereby declare the following to be a full, clear, and exact description of the invention, such as will enable other skilled in the art to which it appertains to make and use the same.

This invention has relation to tilting gates for road or drive ways, railway crossing, etc., and has for its object the provision of very simple devices for operating the gate and at the same time affording a gate that is quite efficient in closing the passage through a way when it is closed.

The nature of the invention is to be fully and clearly ascertained from the device portrayed in the annexed drawings, forming a part of this specification, in view of which the invention will first be described with respect to its construction and manner of operation, and then be pointed out in the subjoined claims.

Of the said drawings—Figure 1 is a side elevation showing the gates in closed position. Fig. 2 is a like elevation showing the gates as opened. Fig. 3 is a plan, Fig. 4 is a transverse section of the line 4—4, Fig. 1. Fig. 5 is a horizontal sectional detail on the line 5—5, Fig. 1.

Similar numerals of reference designate similar parts or features, as the case may be, wherever they occur.

In carrying out my invention, I construct the gate as a whole in two parts or sections 10 and 11, which two parts extend between the front post 12 and the rear post 13.

The section 10 is composed of two top bars 14 and 15, the former constituting the track, as it were, for a purpose to be presently explained, while the latter is a bar for receiving rods or other devices between it and the lower bar 16 of the gate to prevent persons or animals from crawling through between the bars, both sections 10 and 11 will of course be provided with end bars as is shown.

The upper bar 14 of the section 10 is bifurcated at its rearward end as at 17, which extends somewhat beyond the rearward end bar, and the eye 18 of an eye-bolt 19 secured in the post 13 is pivoted in said bifurcation so that the section 10 may be tilted upward on its said pivotal connection with the post 13.

The section 11 which is the forward part of the gate has an upper bar 20 which may be an angle bar, the downward projecting portion 21 of which is provided with antifriction wheels 22 in position so that when the section 11 is moved, rearwardly toward the section 10, the rollers 12 will run on the inclined track-plate or bar 14 and carry the section 11 alongside of the section 10, as is shown in Fig. 2, where the gates are raised or opened.

Between the vertical parts of the angle bar 20 and the lower bar 23 of the section 11, there extend rods or wires to fill the spaces between said bars as in the construction of the section 10.

The lower bars 23 of section 11 and the bars 16 of section 10 will be connected so that one may slide upon the other and yet connect the two sections as one so far as said bars 16 and 23 are concerned.

24 designates the eye-bolt or ring secured in the upper bar 20 of the section 11 from which a rope or cable 25 extends to and over a pulley 26 on the high post 13 to the rear of the gates, said rope extending from the pulley 26 down under a pulley 27 between the hinging post 13 and the post 28 and around said pulley 27 up to a reeling device 29 arranged between the posts 28, the axle of which reeling device is provided with a crank 30 so that the reel may be turned by said crank.

It will be understood, of course, that the rope or cable 25 before mentioned is secured at its rearward end to the reeling device so that by the operation of the crank 30, the rope 25 will be taken up by the reel drawing on the section 11 of the gate at the point 24 and raising it up.

In the raising of the section 11 as described, the forward part of section 10 will be carried up with it and when the two sections reach an inclination, which will incline the bar 14 downwardly, the rollers 20 of the section 11, engaging said bars, will run down thereupon so that the two sections 10 and 11 will come into place side by side and by further reeling up the cable or rope 25, the two sections will be tilted up on end as represented in Fig. 2, leaving the way between the posts 12 and 13 entirely free. The reeling device will be provided with a ratchet wheel 31 with which a pawl 32 pivoted on one of the posts 28 will engage so that the reel may not be turned back by the weight of the gates when the latter are raised.

In lowering the gates, the pawl 32 will be disengaged from the ratchet wheel 31 when the gates by their own gravity will be inclined to fall to horizontal position and when they come down to near a horizontal plane, the upper bar 14 of the section 10 being inclined downwardly will permit the section 11 by its gravity to run off the bar 14 bringing the gate to normal position.

In some cases, it may be sufficient to make the gates 10 and 11 in one piece or part so that by drawing upon the forward end the gate will be tilted on its end and the same means that have been described with respect to the two sections may be operated in the same way, but the construction as described is desirable in places where trolley wires or other devices overhead between the posts 12 and 13 will not permit of so long a gate being raised.

It is to be particularly noted that the cable 20 after passing over the pulley 26 passes down to a pulley 27 near the ground between the posts 13 and 28 and then upward to the reeling device 29 between the two posts 28. This construction is provided to render easier the operation of the cable in raising the gates and more readily regulate the closing of the same, as will be readily understood.

It is obvious that changes may be made in parts or features of the invention within the limits of mechanical skill, without departing from its general nature or spirit.

What is claimed is:

A tilting gate formed in two sections, one section being hinged to its support at its upper rear end, and having its upper bar inclined forward and downwardly, and the other section having its upper bar provided with rollers adapted to run on the upper bar of the first-mentioned section, whereby the two sections may be brought together side by side or extended, one in advance of the other, combined with a cable attached at one end to the second section and at the other end to a reeling device, means for supporting and operating the latter and pulleys and supporting means for the pulleys.

In testimony whereof, I affix my signature, in presence of two witnesses.

KATHARINA LANDAN.

Witnesses:
   A. B. SWITZER,
   A. C. COLE.